United States Patent [19]

McShane

[11] Patent Number: 4,853,240

[45] Date of Patent: Aug. 1, 1989

[54] METHOD FOR DYEING EGGS USING A WATER SOLUBLE DYEING COMPOSITION IN A SHAPED CONTAINER

[75] Inventor: James E. McShane, Memphis, Tenn.

[73] Assignee: Plough, Inc., Memphis, Tenn.

[21] Appl. No.: 97,038

[22] Filed: Sep. 16, 1987

[51] Int. Cl.⁴ .......................... A23L 1/27; A23L 1/32
[52] U.S. Cl. .................................. 426/250; 426/104; 426/290; 426/298; 426/383; 426/540; 426/614
[58] Field of Search ............. 426/250, 614, 289, 104, 426/298, 290, 540, 86, 383; 8/506; 118/18

[56] References Cited

U.S. PATENT DOCUMENTS

| | | | |
|---|---|---|---|
| 3,252,803 | 5/1966 | Belasco | 426/86 |
| 4,181,745 | 1/1980 | Growe et al. | 426/250 |
| 4,419,103 | 12/1983 | Balkan | 8/506 |

*Primary Examiner*—Donald E. Czala
*Assistant Examiner*—Celine T. Callahan
*Attorney, Agent, or Firm*—Thomas D. Hoffman; Gerald S. Rosen

[57] ABSTRACT

A shaped container having therein a water-soluble dyeing composition and a method of dyeing eggs using the shaped containers and a kit containing various shaped containers having therein different water-soluble dyeing compositions.

12 Claims, No Drawings

METHOD FOR DYEING EGGS USING A WATER SOLUBLE DYEING COMPOSITION IN A SHAPED CONTAINER

BACKGROUND OF THE INVENTION

This invention relates to a shaped container having therein a water-soluble dyeing composition and the method of dyeing eggs using said shaped container. This invention also relates to a kit for use in dyeing eggs, containing various shaped containers, wherein each container has therein a different water-soluble dyeing composition.

Eggs generally are dyed for decorative purposes, usually as colored Easter eggs intended primarily for use by children. For many years, such eggs have been dyed by dipping them in water containing a water-soluble dye. The dye is usually placed in the water as a tablet or powder. Although this has been an accepted practice for many years, dyeing eggs creates a mess and in many cases produces unsatisfactory results.

Various methods of dyeing eggs have been proposed to overcome these problems. For example, U.S. Pat. No. 4,181,745 discloses a process for dyeing eggs by applying a dry granular dyeing medium to the hydrated shell of an egg positioned in a plastic bag. U.S. Pat. No. 4,664,925 discloses a method of pretreating eggs in boiling water at pH of 3.2—3.6 to enhance their dyeability and of imparting a flavor fragrance to such treated dyed eggs. Other methods and compositions for dyeing eggs are disclosed in U.S. Pat. Nos. 4,371,555, 4,165,390, 4,139,645 and 2,593,566. None of these methods involve a dye-impregnated shaped container.

Egg Coloring Cubes Easter Egg Decorating kit for dyeing eggs have been sold by Spearhead Industries, Inc. but the use of the Egg Coloring Cubes requires gloves and results in unevenly dyed eggs.

There is still a need for a simple method and kit for dyeing eggs evenly without use of gloves and without creating a mess.

SUMMARY OF THE INVENTION

The present invention provides a method of preparing a shaped container having therein a water-soluble dyeing composition comprising: (a) adding to said container a mixture comprising about 60–80 parts by weight of water, about 10–20 parts by weight of a water-soluble dye carrier, about 4–15 parts by a weight of water-soluble dye and about 0.5–7 parts by a weight of water-soluble dye plasticizer; and (b) drying the so formed admixture to form a water-soluble dyeing composition in said container.

The present invention also provides a shaped container having on its inside surface(s) a water-soluble dyeing composition comprising a water-soluble dye carrier, a water-soluble dye, and a water-soluble dye plasticizer in the ratio of about 10–20 parts by weight of said carrier to about 4–15 parts by weight of water-soluble dye to about 0.5–7 parts by weight of said plasticizer.

The present invention still further provides an improved method of dyeing eggs wherein an egg is contacted with an aqueous dyeing medium for a time sufficient to dye the egg and the dyed egg is removed therefrom and allowed to dry, the improvement which comprises preparing the aqueous dyeing medium by admixing in a shaped container having a water-soluble dye composition on an inside surface thereof, water and an acidifying agent in amounts sufficient to activate the water-soluble dyeing composition and form an aqueous dyeing medium, wherein the water-soluble dye composition comprises a water-soluble dye carrier, water-soluble dye and a water-soluble dye plasticizer in the ratio of about 10–20 parts by weight of said carrier to about 4–15 parts by weight of water-soluble dye to about 0.5–7 parts by weight of said plasticizer.

The kit of this invention comprises a multiplicity of shaped containers, wherein an inside surface of each container has thereon a different water-soluble dyeing composition or mixture of such dyeing compositions.

DETAILED DESCRIPTION

Typical suitable acidifying agents include any food grade water-soluble organic acid or food grade mineral acid including potassium bitartrate (cream of tartar), potassium acid phosphate, tartaric acid, malic acid, citric acid, acetic acid, lactic acid, dilute HC1, glycine and HC1, citrate and CH1 and the like. The acidifying agents are usually present as dilute (0.1N) aqueous solutions. The preferred acidifying agent is acetic acid (vinegar).

Typical suitable water-soluble dye carriers include polyethylene glycols, especially polyethylene glycol 3350 and polyvinyl alcohol as well as other dye carriers will known to those skilled in the art.

Typical suitable water-soluble dye plasticizers includes propylene glycol, low molecular weight polyethylene glycols "PEG", e.g. PEG having a molecular weight less than about 600, and glycerine. A typical low molecular weight PEG is PEG 400. Other dye plasticizers well known to those skilled in the art and which provides adhesion between the shaped container and the dye composition of this invention are also included within the scope of this invention.

We have discovered a quick, simple method of evenly dyeing eggs (as used herein, "eggs" means intact, unbroken eggs, preferably boiled chicken eggs), without the mess and uncertain results associated with prior art dyeing methods and kits. The method of dyeing eggs in its first step entails preparation of an aqueous dyeing medium by adding, with stirring, water and an acidifying agent, e.g. dilute acetic acid or vinegar, to a shaped container having on its inner surface(s) a water-soluble dyeing composition and mixing. The mixing of the solution which is accomplished with a stirrer such as a spoon or any similar stirring device readily available in the home is continued until an aqueous dyeing medium is produced. The amounts of water and acidifying agent such as vinegar are not critical, but should be sufficient to dissolve and thereby activate the water-soluble dye composition present on the inside walls and/or bottom of the shaped container and form an aqueous dyeing medium of a volume sufficient to cover the egg to be dyed. Normally for a 9 oz cup, about ½ cup (120 mL) of water and 1 tablespoon (15 mL) of vinegar are added to each shaped container having therein about 0.034 oz (1 mL) of a water-soluble dyeing composition of a desired color [except red dye composition for which 0.068 oz (2 mL) is used].

In the next step of the method of dyeing eggs, the egg is dipped into the aqueous solution of the desired dye and held there for a time sufficient to dye the egg, usually about 2 or 3 minutes.

In the next step of the method of dyeing eggs, the dyed egg is removed from the dyeing solution and allowed to dry, usually at ambient temperatures.

A preferred embodiment of this invention is a shaped container having therein the water-soluble dyeing composition made by admixing about 60–80 parts by weight of water, usually ordinary tap water, about 10–20 parts by weight of polyethylene glycol as the water-soluble dye carrier, hereinafter "PEG", preferably PEG 3350 such as available from Union Carbide Corp. Danbury, Conn. under the Carbowax 3350 trademark, and about 4–15 parts by weight of dye and about 0.5 to 7 parts by weight of propylene glycol as the water-soluble dye plasticizer. The order of mixing is not critical. In a preferred aspect, the weighed amounts of water and propylene glycol are mixed to form a solution and the PEG and water-soluble dye are successively added thereto with stirring. The solution is normally heated to about 30° C. when the water-soluble dye is added. Normally, the admixing is performed in a large mixing vessel and specific portions, usually about 1 mL of the dyeing composition at 30° C. are transferred to the shaped container and the water is allowed to evaporate at about 25° C. to form a water-soluble dye composition inside the shaped container. The temperature of the drying step is not critical so long as it is not so high that it decompose or adversely affects said water-soluble dye composition or the shaped container. The drying step may be performed by use of any technique, e.g. lyophilization or freeze drying, well known to those skilled in the art.

The amount of water present in the water-soluble dye composition in the inside of the shaped container is not critical and may be any amount (even about 20 weight percent) so long as the water-soluble dye composition is present as a solid or even semi-solid mass on inside of the shaped container. Of course, the precise amount of water present in the water-soluble dyeing composition present as a solid mass on the inside surface(s) of the shaped container will vary as the moisture and temperature air vary.

The shaped container may be of any shape and chemical composition so long as it is compatible with the water-soluble dyeing composition and has a volume (e.g. 250 mL or 9 oz) large enough to hold the egg to be dyed. Normally cups constructed of, for example, glass, polystryene, polyethylene, polyvinyl chloride or polypropylene may be used.

The water-soluble dyes used are the water-soluble FDA-approved dyes conventionally used to color Easter eggs or to decorate eggs. In addition, this invention enables some water-soluble dyes, e.g., F.D.&C. Red #40 to be used where before their color was unsatisfactory for dyeing eggs. Some of the conventional colors used are a combination of, for example F.D.&C. Red #40, F.D.&C. Yellow #5 and F.D.&C. Blue #2 to achieve a brown color; F.D.&C. Yellow #5 and F.D.&C. Red #40 to achieve an orange color; F.D.&C. Yellow #5 and F.D.&C. Blue #1 to achieve a green color; and F.D.&C Blue #1 and F.D.&C. Yellow #5 to achieve a chartreuse color. Other colors and combinations of colors known to the art are also suitable. The specific colors used are not critical to this invention. The amount of water-soluble dye used in the methods and compositions of the present invention depend on the particular dye or mixture of dyes and the color desired. Generally, the amounts vary from about 4–15 weight percent of the water-soluble dyeing composition.

Various modifications such as the pretreatment step of U.S. Pat. No. 4,664,925 and others well known to those skilled in the art may be made without deviating fromthe scope of the present invention.

The following examples illustrate the invention. In each example chicken eggs purchased at a local grocery store are used.

EXAMPLE 1

Yellow Dyeing Composition

A polyvinyl chloride cup (9 oz cup having a bottom diameter of 56 mm, a top diameter of 92 mm and a height of 92 mm) is impregnated with a water-soluble dye composition by the following procedure. Water (63.12 g) and propylene glycol (5.00 g) Sentry grade available from Union Carbide Corp., Danbury, Conn. is admixed at 25° C. in a flask equipped with a stirrer. Carbowax 3350 (20.00 g) is added to the so formed solution and mixing continued until a homogeneous mixture is formed. The temperature of the so formed mixture is raised to 30° C. and F.D.&C. Yellow #5 dye (11.72 g) is added and mixing is continued until a homogeneous dyeing composition is formed. About 1 mL of solution at 30° C. is added to polyvinyl chloride cups and the so-filled cups are allowed to dry at 25° C. until a homogeneous yellow dyeing composition formed as a solid mass inside the cup.

The temperature of the drying step could be raised to an upper limit of about 90° C. whereat polyvinyl chloride begins to soften.

One or more preservatives, e.g. about 0.1 weight percent of citric acid and about 0.6 weight percent of sodium benzoate may also be included in the water soluble dyeing composition.

EXAMPLES 2–6

Following the procedure of Example 1, the following dyeing compositions are prepared and allowed to dry at 25° C. in 9 oz polyvinyl chloride cups to form a solid mass in each cup. In Example 4, 2 mL of red dye is added to the cup, all other aspects of the procedure of Example I are followed.

EXAMPLE 2

Blue Dyeing Composition

| % W/W | Ingredient |
|---|---|
| 79.08 | Water, Purified |
| 15.00 | Carbowax 3350 |
| 4.20 | F. D. & C. Blue #1 |
| 0.90 | F. D. & C. Blue #2 |
| 0.82 | Propylene Glycol, Sentry Grade |

EXAMPLE 3

Chartreuse Dyeing Composition

| % W/W | Ingredient |
|---|---|
| 66.50 | Water, Purified |
| 15.00 | Carbowax 3350 |
| 12.76 | F. D. & C. Yellow #5 |
| 5.00 | Propylene Glycol, Sentry Grade |
| 0.74 | F. D. & C. Blue #1 |

EXAMPLE 4

Red Dyeing Composition

| % W/W | Ingredient |
| --- | --- |
| 73.00 | Water, Purified |
| 12.00 | Carbowax 3350 |
| 10.00 | F. D. & C. Red #40 |
| 5.00 | Propylene Glycol, Sentry Grade |

EXAMPLE 5

Green Dyeing Composition

| % W/W | Ingredient |
| --- | --- |
| 76.00 | Water, Purified |
| 15.00 | Carbowax 3350 |
| 4.00 | F. D. & C. Blue #1 |
| 3.50 | F. D. & C. Yellow #5 |
| 1.50 | Propylene Glycol, Sentry Grade |

EXAMPLE 6

Orange Dyeing Composition

| % W/W | Ingredient |
| --- | --- |
| 67.54 | Water, Purified |
| 15.00 | Carbowax 3350 |
| 11.26 | F. D. & C. Yellow #5 |
| 5.00 | Propylene Glycol, Sentry Grade |
| 1.20 | F. D. & C. Red #40 |

EXAMPLE 7

Add ½ cup (120 mL) of water and 1 tablespoon (15 mL) of vinegar to the cup of Example 1. Mix until the yellow colored dye composition is dissolved.

Dip a boiled egg into the dye solution in the cup for 3 minutes, remove and allow to dry.

EXAMPLE 8

Color Cup Egg Dyeing Kit

Fill each of 6 polyvinyl chloride cups (9 oz.) with a water-soluble color dyeing composition at 30° C. prepared in accordance with each of Examples 1-6. Keep the water-soluble color dyeing composition at 25° C. to dry until a dye composition forms as a solid mass in each cup. Label each of the six cups impregnated with a different dyeing composition with the appropriate color and pack them in a single package containing instructions for use.

What is claimed is:

1. A method of coating an inside surface of a shaped inflexible container with a water-soluble dyeing composition comprising: (a) adding to said container an admixture comprising about 60-80 parts by weight of water, about 10-20 parts by weight of water-soluble dye carrier, about 4-15 parts by weight of water-soluble dye and about 0.5-7 parts by weight of water-soluble dye plasticizer; and (b) drying the so formed admixture to form a coating of water-soluble dyeing composition on an inside surface of said container so that the resulting dried admixture may be activated to dye an egg.

2. A method of claim 1 wherein the drying is performed at about 30° C.

3. A method of claim 1 wherein the drying is performed at ambient temperature.

4. A method of claim 1 wherein the dye is F.D.&C. Yellow #5.

5. A method of claim 1 wherein the dye is a mixture of F.D.&C. Blues #1 and #2.

6. A method of claim 1 wherein the dye is a chartreuse-colored mixture of F.D.&C. Yellow #5 and F.D.&C. Blue #1.

7. A method of claim 1 wherein the dye is F.D.&C. Red #40.

8. A method of claim 1 wherein the dye is a green-colored mixture of F.D.&C. Blue #1 and F.D.&C. Yellow #5.

9. A method of claim 1 wherein the dye is an orange-colored mixture of F.D.&C. Yellow #5 and F.D.&C. Red #40.

10. In a method of dyeing eggs wherein an egg is contacted with an aqueous dyeing medium for a time sufficient to dye the egg and the dyed egg is removed therefrom and allowed to dry, the improvement which comprises preparing the aqueous dyeing medium by admixing in a shaped inflexible container having a dried water-soluble dyeing composition coated on an inside surface, water and an acidifying agent in amounts sufficient to activate the water-soluble dyeing composition and to form an aqueous dyeing medium, wherein said water-soluble dye dyeing composition comprises a water-soluble dye carrier, water-soluble dye and a water-soluble dye plasticizer in the ratio of about 10-20 parts by weight of said carrier to about 4-15 parts by weight of water-soluble dye to about 0.5-7 parts by weight of said plasticizer.

11. A method of claim 10 further comprises the steps of boiling the egg and cooling the boiled egg prior to dyeing the egg in the aqueous dyeing medium.

12. A method of claim 10 wherein the dyed egg is allowed to dry at ambient temperature.

* * * * *